Patented May 6, 1941

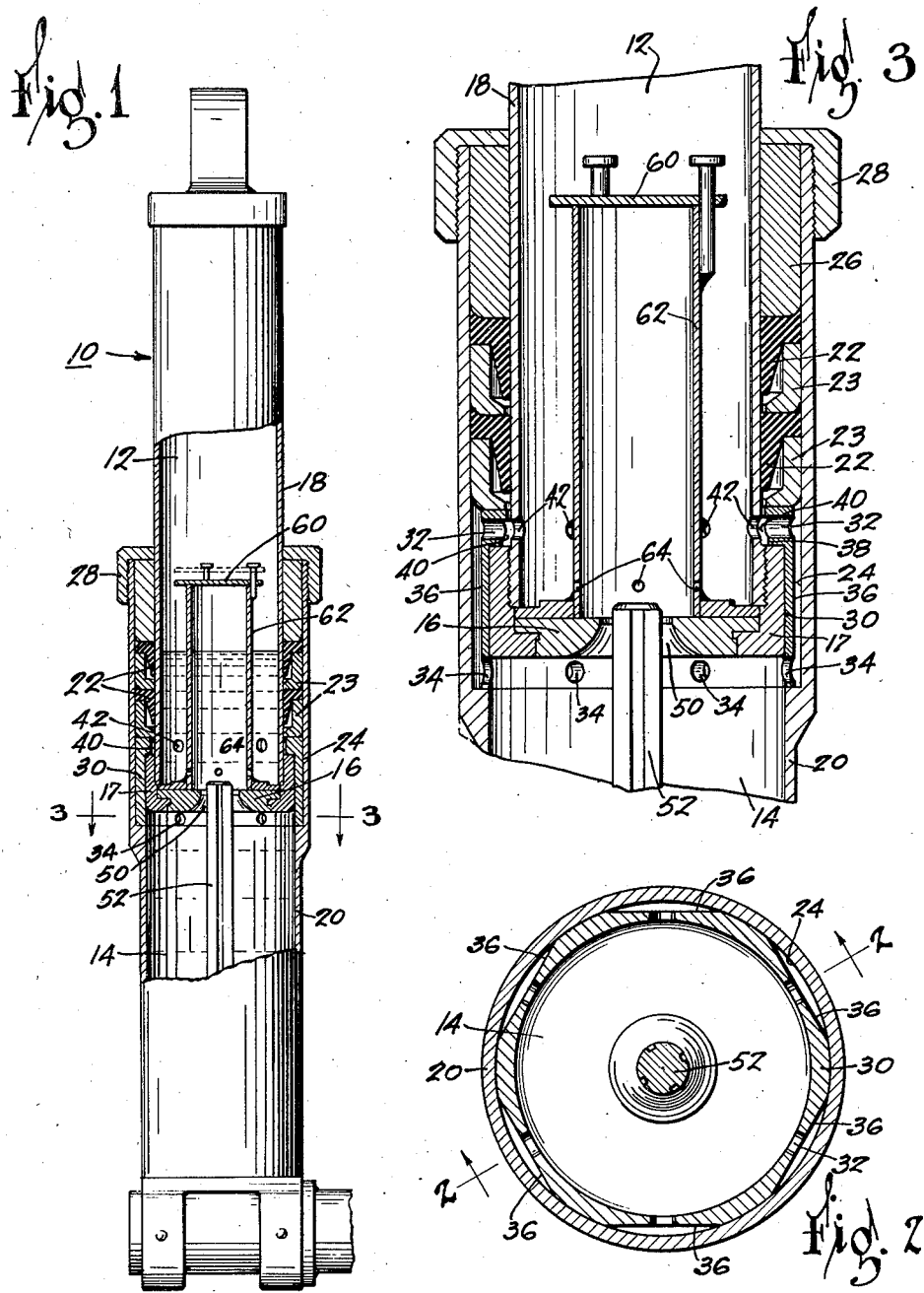

2,241,068

UNITED STATES PATENT OFFICE 2,241,068

SHOCK STRUT

Carl V. Johnson, South Bend, Ind., assignor to Bendix Aviation Corporation, South Bend, Ind., a corporation of Delaware Application September 22, 1939, Serial No. 296,060

7 Claims. (Cl. 267—64)

This invention relates to shock absorbing struts in landing gear of aeroplanes and more particularly to air and fluid type shock struts of aeroplanes having retractible landing gear.

This invention has to do with shock absorbing struts of the compressed air and liquid type, the liquid transfer, under load, being regulated by a metering orifice associated with, or without, a metering pin as desired. When the landing gear is retracted the shock struts, usually used one to a wheel, are fully extended and usually in substantially a horizontal position. This position permits an exchange of a portion of the liquid from a lower liquid chamber to an upper air chamber and a portion of the air from the upper air chamber to the lower liquid chamber. In some landing gear installations the struts are completely inverted when the gear is retracted with the consequent complete displacement of liquid and air from their respective chambers.

An object of this invention is to provide a shock absorbing strut with means to quickly return liquid displaced while in a horizontal retracted position to its normal effective position in the lower chamber of the shock strut as the retractible landing gear of an aeroplane is lowered.

Another object of this invention is to provide means in aeroplane fluid shock absorbing devices to quickly return to the upper chamber all air, which has accumulated in the lower chamber while in the retracted position, before, or soon after, the strut is completely lowered into position for landing the plane, said means to be closed off immediately as the weight of the plane is transferred to the landing gear.

A feature of this invention is the provision of a shock strut comprising a pair of chambers, arranged, one slideable within the other and separated by an apertured baffle or partition wherein a plurality of passages are provided by-passing the apertured partition to maintain the chambers in communication by way of these by-pass passages when the strut is fully extended.

Other objects and features of the invention will more fully appear from the following description taken in connection with the accompanying drawing which illustrates one embodiment thereof, and in which:

Fig. 1 is a view in elevation partially shown in section showing the arrangement of the apertures in and by-passing the baffle or piston.

Fig. 2 is an elevational view in section on an enlarged scale taken substantially on line 2—2 of Fig. 3 showing in detail the arrangement to rapidly by-pass the piston or baffle.

Fig. 3 is a sectional view taken substantially on line 3—3 of Fig. 1.

Referring to the drawing, Fig. 1 shows a telescopic shock strut for aeroplanes generally indicated by the numeral 10 having upper chamber 12 slideably mounted in lower chamber 14, the lower end of chamber 12 being terminated by a baffle or piston head 16 which forms a partition between the upper and lower portions of the strut. The member 16 is securely mounted on a cylinder 18 forming the side walls of the chamber 12. A lower cylinder 20 forming the side walls of the chamber 14 carries a packing 22 to prevent escape of compressed air and liquid at the sliding joint of the cylinders 18 and 20 and permits telescoping thereof. The cylinder 20 is provided with an enlarged bore 24 within which is positioned an annular member 30, held against displacement by the packing 22, packing spacing rings 23, a spacing sleeve 26 and a retaining nut 28 suitably threaded on cylinder 20.

The annular member 30 is provided with two sets of apertures or bores 32 and 34 arranged in longitudinal alignment with flatted portions 36 formed on the outer periphery of the cylindrical member 30. An inwardly extending stepped flange 38 on member 30 provides a stop for cylindrical member 30 and thus limits the movement of piston head 16 of upper cylinder 18 to determine the fully extended position of the shock strut 10.

As shown there is provided an annular passageway 40 between the walls of the cylinder 18 and the annular member 30.

The upper cylinder 18 is provided with a series of holes or bores 42 near the lower end thereof, located to register with the annular passage 40. The piston head 16 is provided with a main metering orifice 50 within which is positioned a metering pin 52 arranged to control the fluid flow therethrough.

As to operation it will first be noted that the shock strut 10 is positioned with its longitudinal axis substantially horizontal or may be inverted, when the aeroplane landing gear, of which it forms a part, is retracted, and that the longitudinal axis is substantially vertical when the landing gear is extended. In the retracted or horizontal position, air from the chamber 12 passes into chamber 14 and is replaced with liquid from chamber 14. It is a desideratum of this invention to return this liquid and air to their respective chambers quickly in order to obtain the desired operation of the shock strut. In the retracted position the shock struts are fully extended and remain so until lowered to landing position and a load imposed thereon when ground contact is made with the wheels of the aeroplane. Thus, during the lowering of the landing gear, during which the longitudinal axes of the shock struts are changed from a horizontal to a vertical position, it will be noted that, referring to Fig. 3 of the drawing, air may pass rapidly upward from chamber 14 into chamber 12 through a plurality of orifices 34, thence upwardly through passages formed by the flatted portions 36 of the member 30 and the inner periphery of the enlarged bore 24 of the cylinder 20 to outlet orifices 32 communicating with the annular passage 40 which in turn communicates with the chamber 12 through the orifices 42. Liquid from the chamber 12 will be transposed (by gravity) to the chamber 14 through the same orifices and passages but in the reverse order to that outlined above. This movement of the liquid and air is taking place while the shock strut is being lowered from the horizontal position, inasmuch as the air moves upwardly on the top side of the strut and the liquid moves downward on the lower side thereof to effect a rapid transportation to their respective chambers. In addition, air and liquid return to their respective chambers through a central orifice 50 described below. The instant a load is applied to the strut 10, the cylinder 18 with the integral piston head 16 moves downwardly into the cylinder 20, the sleeve 17 carrying piston head 16 thereby closing the ports 34 to shut off communication between the chambers 12 and 14 by way of the by-passes just described. The flow of liquid from chamber 14 to chamber 12 thereafter during operation must be through the metering orifice 50 as prescribed by the contour of metering pin 52 moving upwardly through.

When the strut 10 is telescoped under load the liquid is pushed upwardly through the orifice 50 and flows past a disk check valve 60 mounted on a tube 62 in chamber 12. The liquid is trapped therein by the closing of the check valve 60 and must return through orifice 50 by way of metering apertures 64 located near the base of the tube 62. The apertures 64 control the rate of return of the liquid to give a snubbing action in the extension of the shock strut after compressing under load.

While a preferred embodiment of the invention has been described, it is to be understood that this is given merely as an example of the underlying principles of the invention, and since this may be incorporated in other specifications of mechanical structures, I do not intend to be limited to that shown, except as such limits as are clearly imposed by the appended claims.

I claim:

1. A shock strut comprising a pair of telescoping cylinders, a partition having a metering orifice associated with the inner cylinder to form a piston head, by-pass means having a plurality of passages by-passing the piston head and means to render said by-pass means inoperative except when the strut is fully extended.

2. A shock absorber comprising a pair of chambers, a movable partition interposed between the chambers, a communication passage between the chambers, a by-pass passage between the chambers and means closing the by-pass passage upon movement of the partition from the position assumed at full extension of the strut.

3. A shock strut comprising a pair of telescopic chambers, a piston head forming a baffle between said chambers, a main orifice in the piston head for continuous communication between the chambers and a passage by-passing the piston head for communication between the chambers when the strut is fully extended.

4. A shock strut comprising a pair of telescopic chambers, a piston head forming a baffle between the chambers, a main orifice in the piston head, a metering pin in the orifice, said orifice permitting continual communication between the chambers; a plurality of passages by-passing the piston head, said by-pass passages permitting communication between the chambers only when the chambers are in a pre-determined point relation.

5. A shock strut comprising an outer cylinder, an inner cylinder slidably mounted within the outer cylinder, a piston head formed on one end of the inner cylinder, a port in the piston head, said outer cylinder formed with an enlarged bore at the open end thereof, an annular member secured in the enlarged bore, a plurality of flatted areas on the outer periphery of the annular member, ports formed in spaced relation in the flatted areas of the annular member and ports formed in the inner cylinder in spaced relation with the ports of the annular member, said ports and passages registering for communication between the chambers of the cylinders when said cylinders are in a pre-determined relation.

6. A shock strut comprising an outer casing and a telescoping inner casing, and having a communication between said casings, further characterized in the provision of by-pass means forming an additional communication between the casings, and means to render said by-pass means inoperative upon telescoping of the casings.

7. A shock strut comprising a pair of telescoping cylinders, a partition for a metering orifice associated with the inner cylinder to form a piston head, by-pass means by-passing the piston head, and means to render said by-pass means inoperative except when the strut is fully extended.

CARL V. JOHNSON.